United States Patent [19]

Laurich-Trost

[11] Patent Number: 4,893,689
[45] Date of Patent: Jan. 16, 1990

[54] METHOD AND APPARATUS FOR STEERING A MOTOR VEHICLE

[76] Inventor: Victor R. Laurich-Trost, 34600 McAfee Dr., Solon, Ohio 44139

[21] Appl. No.: 198,720

[22] Filed: May 24, 1988

Related U.S. Application Data

[63] Continuation of Ser. No. 69,096, Jul. 2, 1987, abandoned.

[51] Int. Cl.⁴ .............................................. B62D 7/14
[52] U.S. Cl. ...................................... 180/140; 280/91
[56] References Cited

U.S. PATENT DOCUMENTS 3,933,215  1/1976  Scheurle ..................... 180/140 X
4,175,638 11/1979  Christensen ..................... 180/140
4,315,555  2/1982  Schritt ........................... 180/140

Primary Examiner—John A. Pekar
Attorney, Agent, or Firm—Watts, Hoffmann, Fisher & Heinke

[57] ABSTRACT

A utility vehicle having multiple modes of steering. A mode switch on the vehicle dashboard allows an operator to select a steering mode. This selection sets up a master and slave relationship between the front and rear wheels. The master set of wheels (which can be either the front or rear wheels) is controlled by the vehicle steering wheel. The slave set of wheels is controlled by a feedback control circuit that orients the slave wheels in ways that depend on which mode of steering the operator chooses.

10 Claims, 7 Drawing Sheets

METHOD AND APPARATUS FOR STEERING A MOTOR VEHICLE

This is a continuation of co-pending application Ser. No. 069,096 filed on July 2, 1987, now abaondoned.

TECHNICAL FIELD

The present invention relates to a multi-mode steering control for a utility vehicle or the like.

BACKGROUND ART

U.S. Pat. No. 4,446,941 to Laurich-Trost which issued May 8, 1984 entitled "Steering System for Utility Vehicle" discloses a utility vehicle which can be operated in a number of different steering modes depending upon the desired use of the vehicle. Four different steering modes are suggested.

The utility vehicle disclosed in the '941 patent has a fork lift at one end and a hydraulically activated boom at an opposite end for performing material handling, excavating, and other utility vehicle tasks. In addition, the vehicle includes an outrigger mechanism which can be selectively used to increase the stability of the vehicle during work operations.

Use of the utility vehicle for a number of different operations such as excavating and the like have resulted in a multiple steering mode design that provides the vehicle operator great latitude in maneuvering the vehicle. When maneuvering such a vehicle, it is desirable to be able to steer the vehicle with either the front or rear wheels. In these two modes of operation, one or the other set of wheels turns and the wheels at the opposite end of the utility vehicle remain fixed in a straight line orientation.

As noted in the afore mentioned '941 patent, it is also especially desirable to maneuver such a vehicle with both the front and rear wheels maneuvering in unison in a coordinated fashion. A so-called radius steering mode of operation causes the front and rear wheels to turn the same amount but in opposite directions to achieve a tight vehicle turning radius. In the so-called "crab" steering mode of operation, both front and rear wheels turn in unison in the same direction. This mode of maneuvering allows sideways movement of the vehicle. In combination the four modes of operation allow the operator to move the utility vehicle in an ingenious manner unavailable in prior art systems.

The apparatus for accomplishing the multi-mode steering of the '941 patent suggests utilization of tracking sensors to monitor the orientation of both the front and rear wheels and using a feedback control system to controllably regulate the orientation of the wheels during steering.

DISCLOSURE OF THE INVENTION

The present invention relates to a control system for monitoring and controlling wheel orientation of a motor vehicle. The orientation of a monitored wheel is controlled to reduce any orientation difference between the monitored wheel and a control signal related to an appropriate wheel orientation.

A steering control system constructed in accordance with the invention includes a drive circuit for controllably turning a vehicle wheel. The drive circuit includes a servo drive and servo coil which when energized by the servo drive operates a hydraulic valve to activate a power steering motor which turns the wheel. The direction of turning is dependent upon the sense or direction in which current flows through the servo coil.

Orientation sensors, preferably potentiometers coupled to the vehicle wheels, generate output signals corresponding to the orientation of the vehicle wheels. A comparator circuit includes inputs responsive to first and second orientation signals from two sensed wheels and generates a control signal related to a difference between the first and second orientation signals. This difference signal is used as a control output to the servo drive to energize the servo coil in a particular sense and with a particular amplitude current.

As noted above, the utility vehicle can be steered in one of four user-selectable modes. In two of the four modes, either the rear or the front wheels of the utility vehicle are straightened for front wheel or rear wheel only controlled steering. In this mode of steering control, the comparator receives one input from a wheel whose alignment is to be maintained in a straight orientation. A second input is a constant amplitude signal calibrated to straighten the wheel regardless of the vehicle orientation. In use, the vehicle may exert forces on one of its constant orientation wheels to temporarily displace that wheel from its straight line orientation. The comparator will then generate a different signal which in turn causes the servo coil to generate an output signal to straighten that wheel.

During both the crab steering mode and the radius steering mode, the orientation signals from the wheel potentiometers coordinate turning of the vehicle so that both front and rear wheels are rotated a corresponding amount away from their straight line orientation. In the crab steering mode, the wheels are maintained in alignment, and in the radius steer, the rotation away from the normal orientation is equal and opposite in the front and rear.

One aspect of the drive system for energizing the servo coil is the utilization of a oscillating signal superimposed with the output from the comparator amplifier. The resulting oscillatory servo coil signal drives the wheel in a start and stop fashion. This more easily overcomes any resistance to turning of the wheel due to friction.

The inputs to the comparator amplifier are configured to define a master/slave configuration where a master wheel and an associated slave wheel are at different ends of the utility vehicle. During front end or rear steer only, the master signal is generated by a fixed potentiometer that is not coupled to any wheel, but instead produces a constant amplitude output. The slave wheel in this instance is the wheel to be maintained in a straight line orientation.

In the crab and radius steer modes the master wheel is oriented by the vehicle steering wheel and the slave wheel is oriented by the servo drive to track the master wheel. In an embodiment of the invention where two front wheels are mechanically connected together and two rear wheels are also mechanically connected together, one front wheel and one rear wheel are monitored in each of these four wheel steer modes.

From the above it is appreciated that one object of the invention is a new and improved steering mode control circuit and method for accomplishing a multi-mode steering operation. This and other objects, advantages and features of the invention will become better understood when a detailed description of a preferred embodiment of the invention is described in conjunction with the accompanying drawings.

BEST MODE FOR CARRYING OUT THE INVENTION

Figure 1:
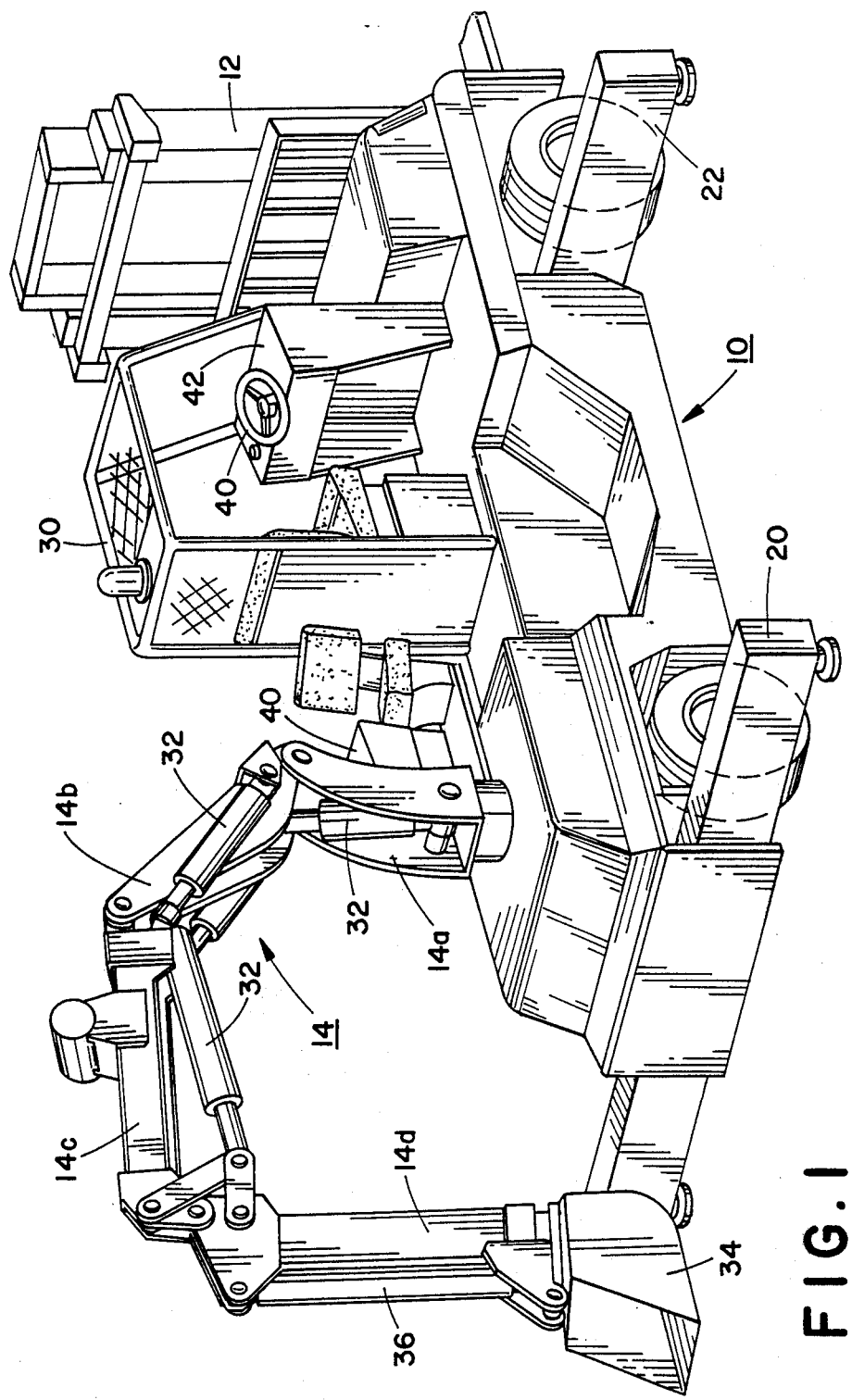
FIG. 1 is a perspective view of the utility vehicle utilizing multiple modes of steering.

Turning now to the drawings, FIG. 1 is a perspective view of the utility vehicle 10 that includes a fork lift 12 and a boom 14 that can be hydraulically activated. The utility vehicle of FIG. 1 is shown in a fixed location wherein stabilizers 20, 22 stabilize the utility vehicle during work operations of the boom and/or fork lift. Generally, the stabilizers 20, 22 are only used for maximum extension of the boom 14 laterally over the side of the vehicle 10. Under certain conditions it is possible to operate the boom 14 over the front or rear without using the stabilizers 20, 22. During maneuvering of the utility vehicle 10, these stabilizers 20, 22 are retracted so that a vehicle operator seated in the vehicle cab 30 can maneuver the vehicle for work operations.

The boom 14 includes a number of pivotally connected segments 14a, 14b, 14c, 14d which can be extended by activation of a number of hydraulic drive cylinders 32. At an outer end of the boom 14 a shovel 34 pivotally connected to the outermost boom section 14d is imparted a scooping action by an additional hydraulic drive cylinder 36. During operation of the boom 14 and shovel 34, a vehicle operator controls the shovel 34 via a control console 40 mounted to the utility vehicle 10. In addition to allowing the operator to retract and extend the boom 14, the console 40 includes an actuator to allow a drive (not shown) to rotate the boom 14 about a vertical axis so that the shovel 34 can be moved to either side of the utility vehicle.

Figure 3:
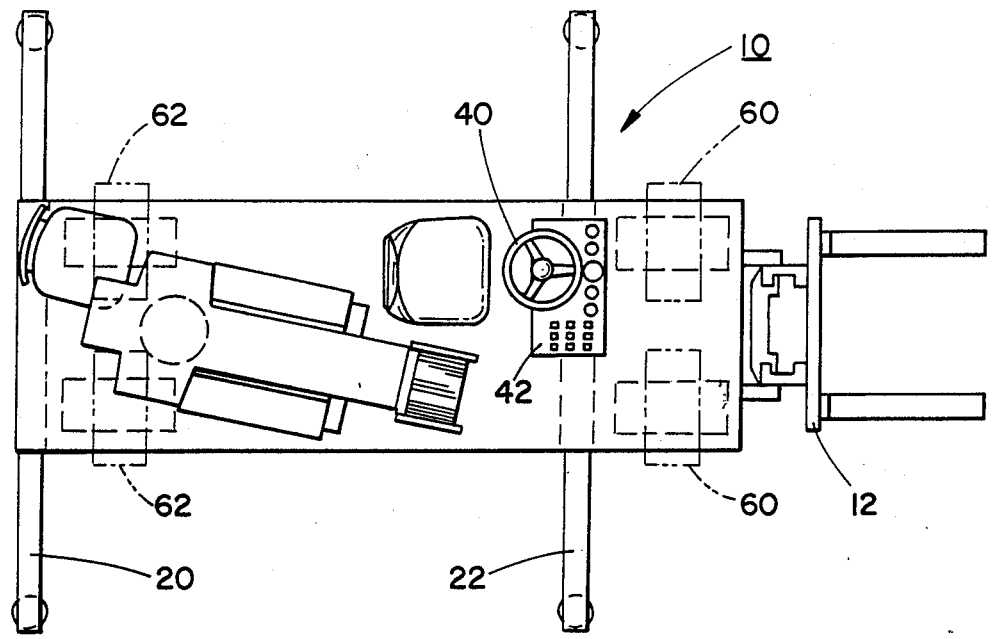
FIG. 3 is a plan view of the utility vehicle shown in elevation in FIG. 2.
Figure 2:
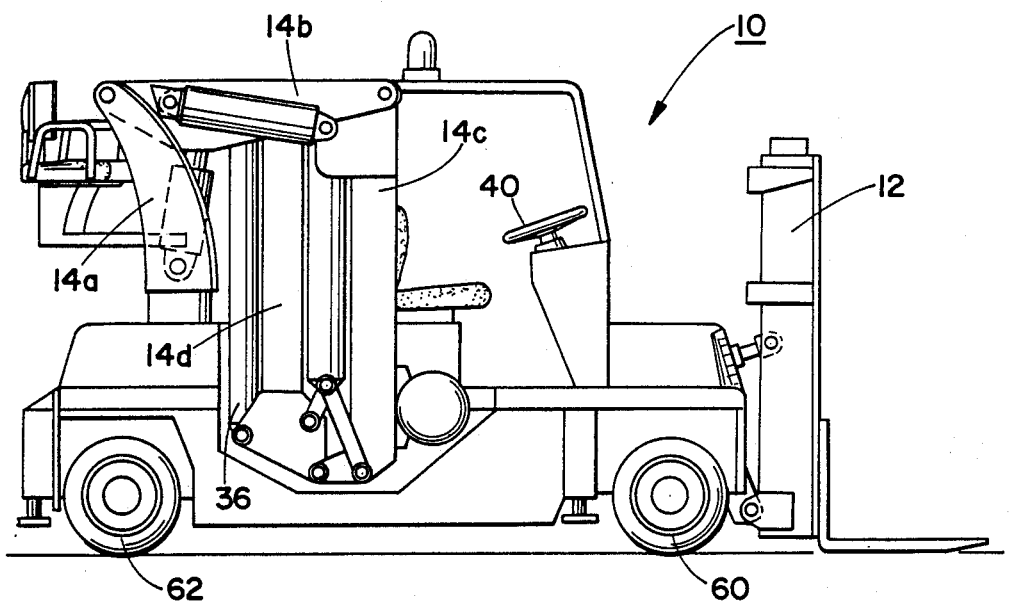
FIG. 2 is an elevation view of the FIG. 1 utility vehicle.

The boom sections 14a-14d are constructed in such a manner that when not in use, the boom 14 can be folded in upon itself and stored (see FIGS. 2 and 3). When so stored, the utility vehicle 10 can be more easily maneuvered since the boom 14 no longer extends beyond the sides of the vehicle.

The fork lift 12 is of a conventional design and includes a mechanism for raising and lowering two prongs 12a, 12b of the fork lift. In addition, the vertical orientation of the fork lift 12 can be adjusted by a hydraulic actuator 37, and in particular it can be tilted backward to stabilize loads carried by the prongs 12a, 12b.

A vehicle steering wheel 40 allows an operator seated within the cab 30 to maneuver the utility vehicle 10 in preparation for work operations with either the fork lift or boom. The steering wheel 40 is coupled to a vehicle dash board 42 that includes a number of indicator and control elements.

Figure 12:
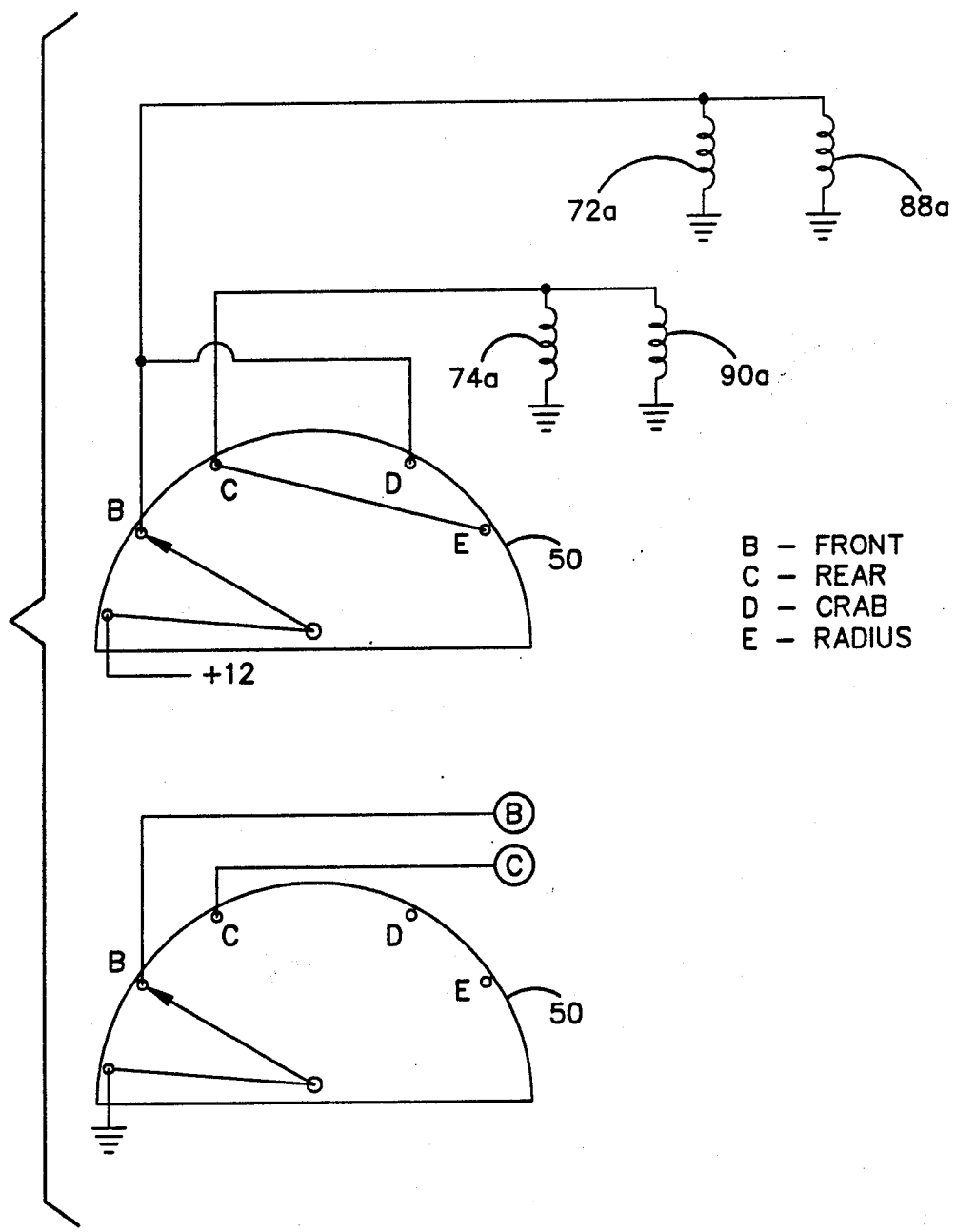
FIG. 12 is a schematic of the mode switch showing and output from the mode switch to solenoid activation coils.

To the immediate left of the steering wheel 4 as viewed from the position of the vehicle operator, a mode selector switch 50 allows the vehicle operator to choose one of four steering modes of operation. The position of this switch 50 dictates which of the four aforementioned modes of steering the operator has available to maneuver the utility vehicle 10. The switch 50 is schematically depicted in FIG. 12 as a gauged, four position switch with the switch settings labeled B-E.

Figure 4:
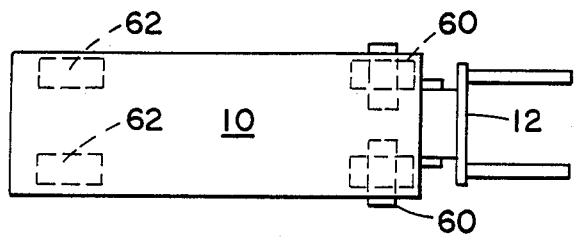
FIGS. 4-7 illustrate four different modes of steering operation that are operator selectable.

FIGS. 4-7 schematically illustrate these four steering modes. A utility vehicle 10 in FIG. 4 is seen to include two front wheels 60 and two rear wheels 62. Although only one tire is illustrated at each pivot point, the present invention can be used with vehicles having multiple tires at each pivot point. As seen in FIG. 4, the rear wheels 62 are oriented parallel to the utility vehicle 10 and only the front wheels 60 are rotated during steering. This front wheel steering mode of operation conforms most closely to the steering of a conventional on-the-road motor vehicle.

Figure 8:
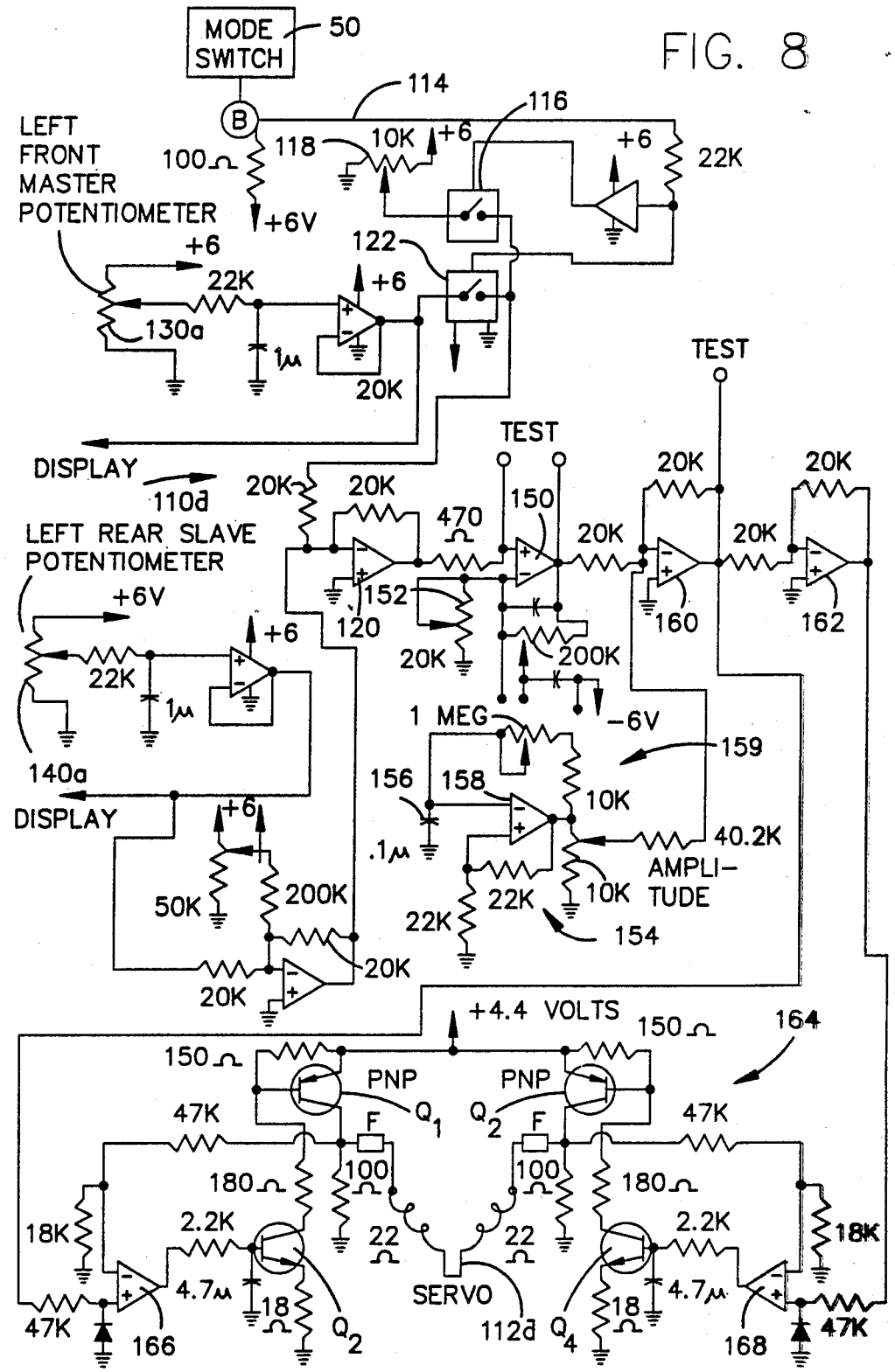
FIGS. 8A and 8B are schematics of two identical steering control circuits utilized with the invention.
Figure 11:
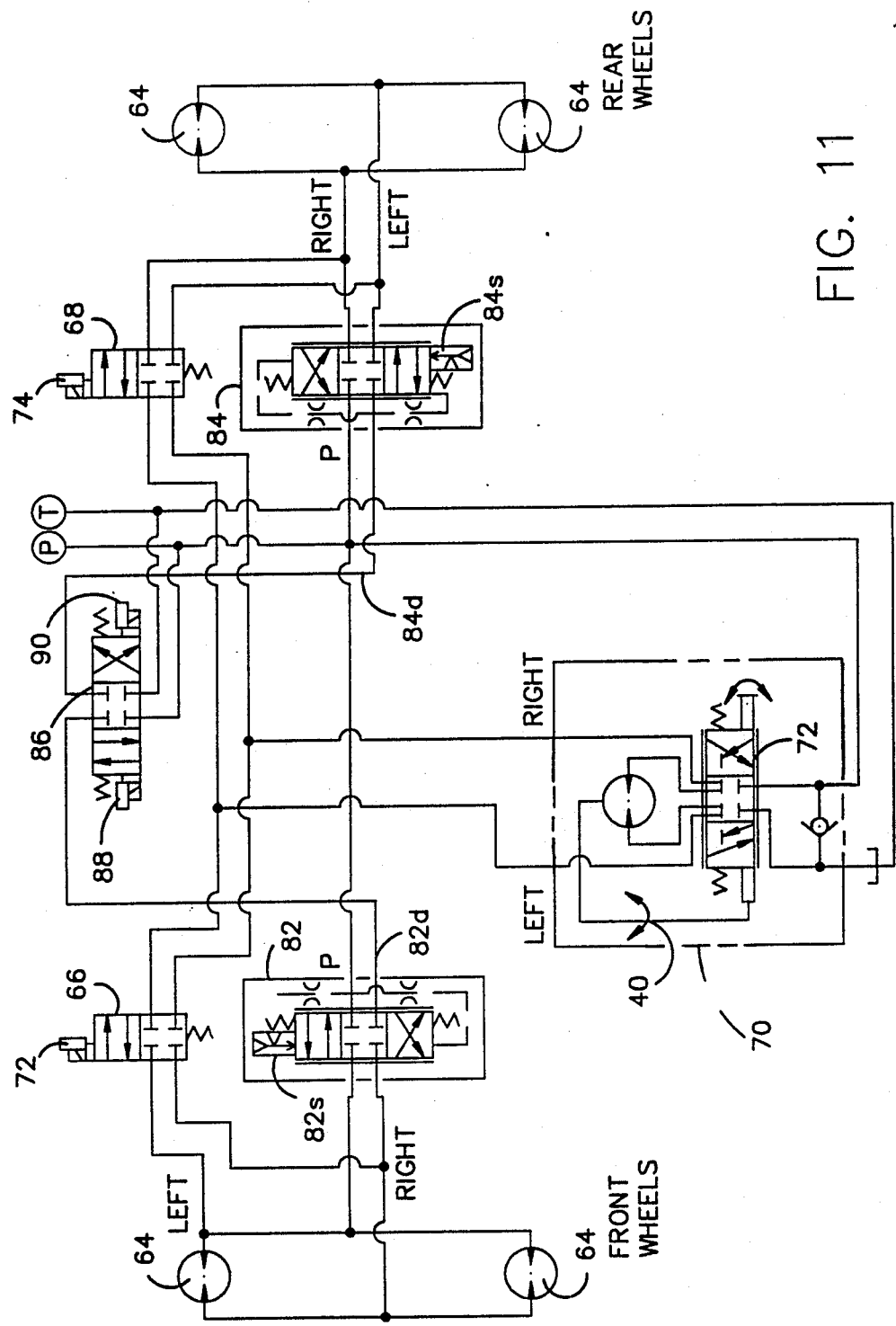
FIG. 11 is a hydraulic schematic showing solenoid actuated valves for powering turning motors coupled to the vehicle wheels.

In the illustrated embodiment, the two front wheels 60 are mechanically interconnected for synchronous turning movement by means of a tie rod assembly. In the front wheel only mode of steering operation, the two wheels 60 respond to a hydraulic power steering unit 70 (FIG. 11) controlled by rotation of the vehicle steering wheel 40. The rear wheels 62 turn only to reorientate those wheels in a straight line orientation as shown in FIG. 4. Any reorienting of the rear wheels 62 takes place under control of a steering control circuit 110 (FIG. 8) described below.

Published U.K. Pat. No. 2,066,189B to Laurich-Trost entitled "Multi-Purpose Utility Vehicle" discloses additional details of a utility vehicle having multiple modes of steering. The disclosure of that patent is also incorporated herein by reference.

Figure 5:
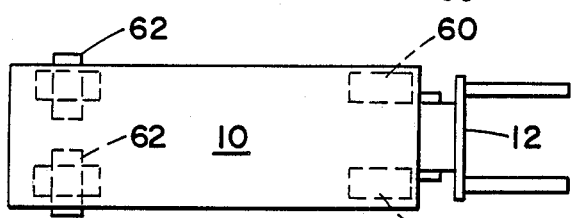
Figure 6:
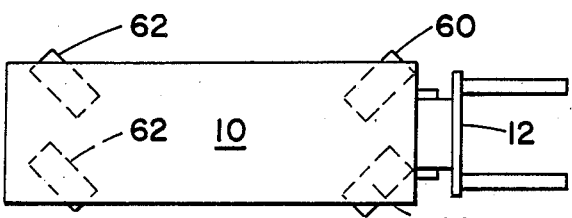
Figure 7:
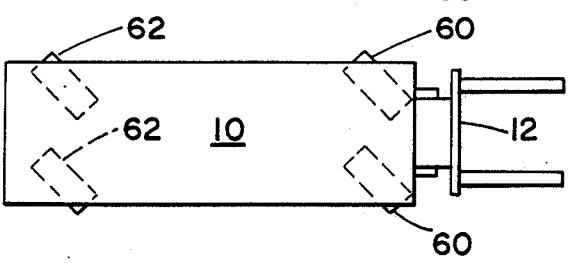
Figure 9:
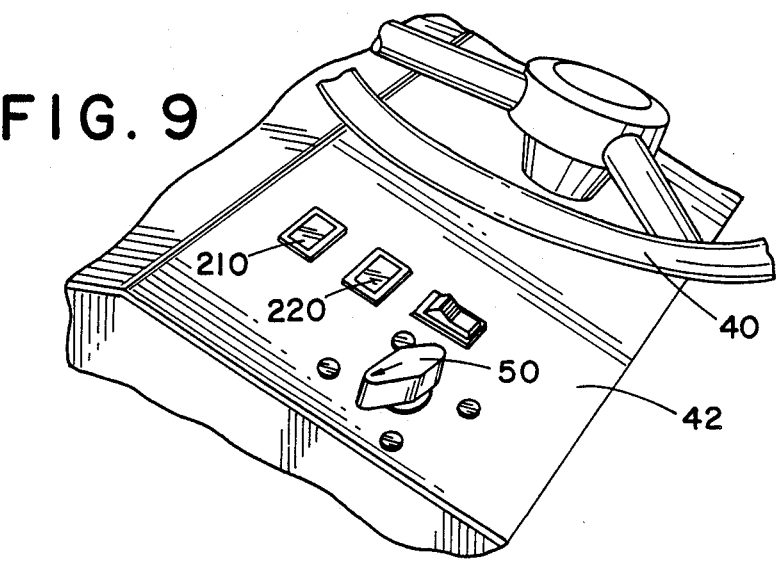
FIG. 9 is a perspective of an operator control panel including a mode switch used to adjust the steering mode of the utility vehicle.

FIGS. 5-7 illustrate the utility vehicle 10 and front 60 and rear 62 wheels. The FIG. 5 schematic disclosure shows a rear wheel only mode of operation. FIG. 6 shows the radius steering wherein the front 60 and rear 62 wheels rotate in a coordinated fashion but in opposite directions. The final steering mode is depicted in FIG. 7. In this "crab" steering mode the front and rear wheels 60, 62 also rotate in unison but in the same sense. Thus, when the front wheels 60 turn to the right, the rear wheels 62 also turn to the right.

The utility vehicle includes four hydraulically activated power steering drive motors 64 (FIG. 11), one for each of the vehicle's wheels. Each of the motors 64 are powered by a common hydraulic pump P that rotates fluid to the motors 64 from a common reservoir or tank T. Two valves 66, 68 open and close in response to actuation of the mode switch 50 to couple one or the other of the vehicle's set of wheels (front or rear) to the power steering unit 70. The valves 66, 68 are on/off valves that are opened and closed by solenoid energization coils 72a, 74a (FIG. 12) coupled to the mode switch 50. Turning of the steering wheel 40 opens and closes a steering valve 72 within the vehicle power steering unit 70 to cause either the front or rear wheels to turn depending upon which valve 66, 68 is open. In the discussion that follows, the wheels that responds directly to an operator turning the vehicle steering wheel 40 are referred to as the master wheels and the wheels that are electronically oriented by energization of a servo coil are referred to as the slave wheels.

In addition to opening and closing the valves 66, 68 the mode switch 50 activates two servo valves 82, 84. A three-way valve 86 having two solenoid actuators 88, 90 determines which of the two valves 82, 84 is active. The solenoid actuators 88, 90 are driven by two solenoid coils 88a, 90a (FIG. 12). Each of the two valves 82, 84 has an associated drain 82d, 84d coupled to the valve 86. When the drain of one of the valves 82, 84 is connected through the valve 86 to the hydraulic tank T the valve is active. If, for example, the mode switch 50 is set in the front steer only mode, (setting B, FIG. 12) the coil 88a is energized causing the drain 84d of the valve 84 to be coupled to the tank T. In this mode the steering wheel 40 controls rotation of the front wheels (master) and the valve 84 controls any turning of the rear wheels (slave).

Sensing the master wheels and coordination of slave wheel rotation during the four modes of steering operation is accomplished with two steering control circuits 110a, 110b depicted in FIGS. 8A and 8B. The steering control circuit in FIG. 8A energizes a servo coil 112a to control the orientation of the slave wheels with the mode switch set at settings B and D. An identical circuit depicted in FIG. 8B energizes a second servo coil 112b to steer slave wheels with the mode switch set at settings C and E (FIG. 12).

There are four potentiometers 130a, 130b, 140a, 140b connected to the four vehicle wheels to sense the orientation of those wheels and generate electrical outputs to enable the control circuits 110a, 110b to monitor the orientation of the wheels relative to each other. The circuit of FIG. 8A controls the front wheel steer mode of operation and the crab steering mode of operation. The simplest control is in the front steer only mode (setting B) wherein a top conductor 114 is grounded by the mode switch 50. This causes a control gate 116 to close coupling a calibrated output from a potentiometer 118 to be coupled to a summing amplifier 120. The ground signal from the steering mode switch 50 on the conductor 114 maintains a second gate 122 open so that control signals from a master potentiometer 130a coupled to the left front wheel do not reach the summing amplifier 120. Therefore, the master signals in this mode are from the calibrated potentiometer 118 and in particular this potentiometer is adjusted to maintain the slave wheels (rear wheels) in a straight orientation.

A potentiometer 140a coupled to the rear left wheel is the slave potentiometer and can vary slightly from its center position as the front steering and maneuvering of the vehicle takes place. This may be caused, for example, by the rear wheel encountering a slight unevenness or obstruction in its path causing the wheel to be deflected to the side. When this occurs, the summing amplifier 120 will receive an input from the slave potentiometer 140 causing it to correct the imbalance and straighten the rear wheel orientation.

The output from the summing amplifier 120 is coupled to a non-inverting input of an amplifier 150 whose gain is adjustable via a potentiometer 152 coupled to the inverting input of that amplifier 150. This signal is combined with a dither signal from an astable multivibrator oscillator 154 that includes a capacitor 156 that is repeatedly charged and discharged by an output from an operational amplifier 158. A variable feedback resistor network 159 and the capacitor 156 determine the frequency of oscillation.

In operation, the combination of the gain and dither signal will be an oscillatory square wave having a frequency that can be adjusted from a high of approximately 18,000 cycles/sec. to a low of approximately 1 cycle/sec. and 6-8 volts peak to peak that goes both positive and negative. When the rear wheels are properly oriented, the positive and negative signals will balance. When the rear wheel is deflected from its straight orientation, however, the net signal will be either positive or negative and cause the remaining components of the circuit 110a to energize the servo coil 112a to straighten the rear wheels.

The combination gain and dither signal is coupled through two inverter circuits 160, 162 to a servo coil drive circuit 164. The output from the first inverter 160 is coupled to a first buffer amplifier 166 which drives an NPN biasing transistor Q2. The output from the second inverter 162 transmits a signal to a buffer amplifier 168 which in turn drives a second NPN biasing transistor Q4. The bias state of these two transistors in turn controls the base input of two power transistors Q1, Q3. The current through these power transistors drives the servo coil 112a in either sense depending upon the status of the two biasing transistors Q2, Q4. In a balanced configuration, the voltage at the two sides of the servo coil 112a is equal. The current passing through the two transistors Q1 and Q3 is the same so the potential on opposite ends of the coil 112a is the same (or approximately so). If, however, the biasing of the transistors Q1, Q3 becomes unbalanced due to an unbalanced output from the two circuits 160, 162, a net voltage will be applied across the servo coil 112a causing a servo valve 84 to be energized in one of two directions by an amount proportional to the current through the coil 112a. The servo valves 82, 84 include electro-mechanical torque motor assemblies 82s, 84s that cause the valves to open and close an amount proportional to the current in the coils 112a, 112b. These valves are commercially available from Dyval Inc. of 923 Industrial Ave., Palo Alto, Ca., 94303 as Dyval Model #12 valves.

Since current through the coil 112a sets the position of the servo valve 84 (which was activated when the mode switch was set to its B setting) this causes the slave wheels to turn an amount proportional to the current through the coil 112a. The turning of the slave wheels reduces the difference of the inputs to the summing amplifier 120 and reduces the current in the coil 112a until the slave wheel is properly aligned.

In the crab steer mode of operation (one in which the front and rear wheels track each other during operator maneuvering of the vehicle) both potentiometers 130a, 140a direct outputs to the amplifier 120. With the mode switch 50 in setting D (crab steering) the input at the conductor 114 goes high, which opens the analog gate 116, closing the analog gate 122, and connecting the potentiometer 130a to the amplifier 120. The master potentiometer 130a (front left wheel potentiometer) is under the control of the user and changes output depending upon how the user has oriented the front wheels. This is one input for the summing circuit. The second input is from the slave potentiometer 140a (left rear potentiometer) which generates an output indicative of the orientation of the left rear wheel. The summing amplifier produces an output which will be essentially zero when the two wheels are aligned but which deviates from this situation in response to user control through the steering wheel 40. When the output from the amplifier 120 deviates from zero, a net signal is combined with the dither signal from the oscillator 154 and causes the average output from the two inverting amplifiers 160, 162 to be either above or below the zero or neutral position. This in turn controllably biases the control transistors Q2, Q4 causing an unbalanced situation across the servo coil 112a. This unbalanced situation causes the slave wheels to be oriented at the same orientation as the master. Thus if the user turns the front wheel to the right, the servo coil will be energized to cause the left rear wheel to also move to the right accomplishing the crab steering mode of operation.

A second servo coil circuit shown in FIG. 8B operates in identically the same manner as the circuit of FIG. 8A. The FIG. 8B circuit, however, energizes the servo coil 112b that controls the valve 82 via the torque motor assembly 82s. With the mode switch in either the "C" or "E" (rear or radius) steering mode the coils 74a, 90a (FIG. 12) are energized. This opens the valve 68 causing operator control via the steering wheel 40 to turn the rear wheels. This also energizes the solenoid 90 and connects the drain 82d from the servo valve 82 to the tank T. As the coil 112b is energized the servo valve 82 responds to eliminate discrepancies between the master signal from either the potentiometer 118 or the potentiometer 130b (FIG. 8B) and the signal from the slave wheel (right front) potentiometer 140b.

It is noted that the valves 82, 84 are configured so that the current through the two coils 112a, 112b produces an appropriate slave wheel turning motor response in the crab and radius steering modes. In the crab steering mode the slave wheel is made to align with the master and in the radius mode the slave wheel is rotated in an equal but opposite direction.

Figure 10:
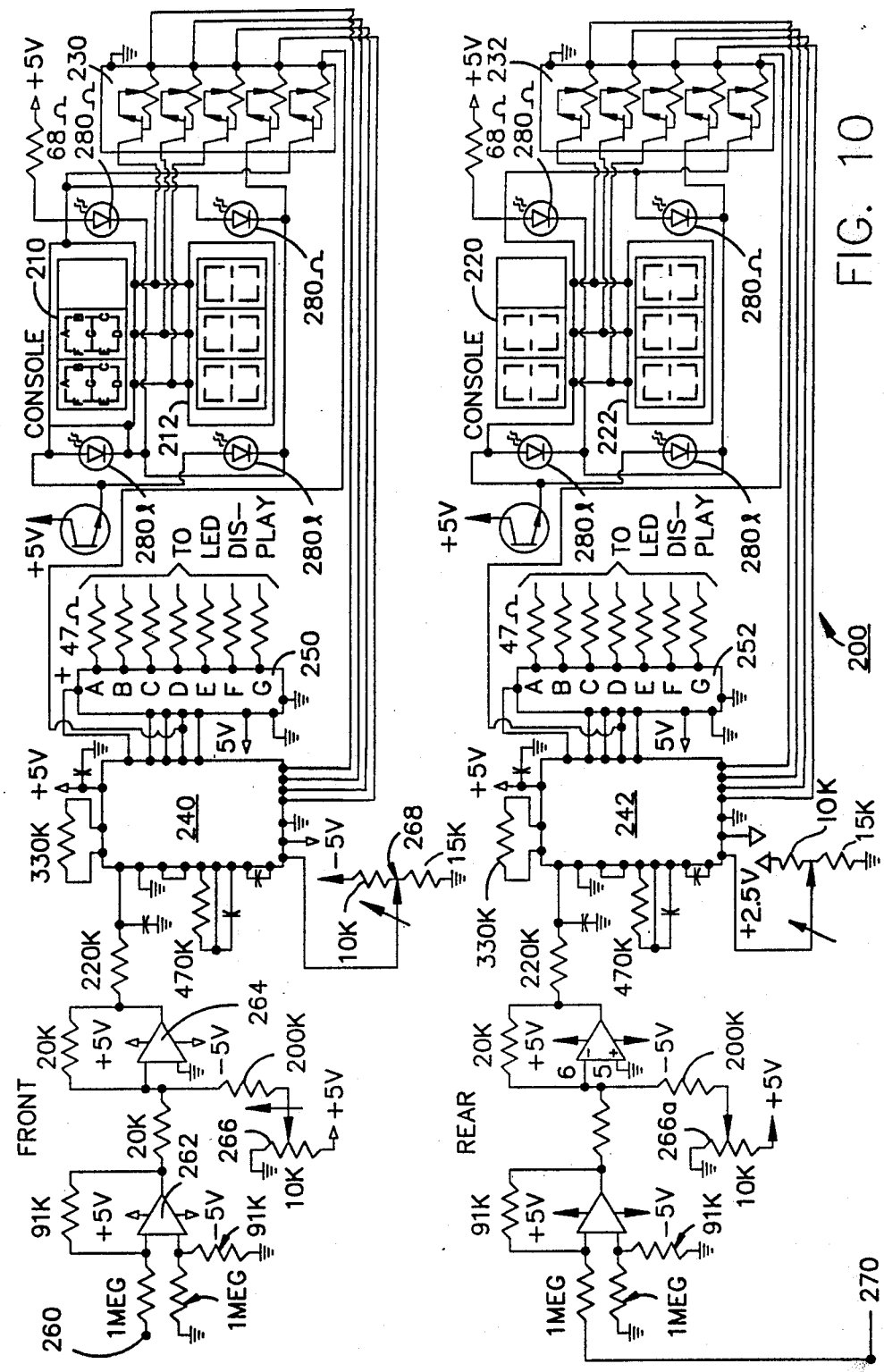
FIG. 10 is a schematic of a circuit for displaying wheel orientation on the operator control panel.

A display circuit 200 (FIG. 10) aprises the operator of the orientation of the front and rear wheels as they rotate in response to servo coil energization. A first LED display 210 on the dashboard 42 displays the front wheel orientation and a second LED display 220 displays the rear wheel orientation. A LED display of "00" means the wheels are pointing in a straight line and deviations are in degrees so that "90" on the display indicates the wheels are rotated a full 90 degrees away from a straight line orientation. Two additional displays 212, 222 are mounted to control module beneath the vehicle body to display wheel orientation to aid in electronic diagnostics.

The LED displays 210, 212, 220, 222 are activated by the combination of two line drivers 230, 232 two analog to digital converters 240, 242, and two binary coded decimal to seven segment decoder/drivers 250, 252. Analog inputs from the two front wheel potentiometers 130a, 140b are input to the display circuit 200 at an input 260 to a buffer amplifier 262. An output from the buffer amplifier 262 is coupled to an amplifier 264 whose output can be adjusted by a variable potentiometer 266 for centering the display output. This amplifier 264 transmits an analog signal to the A/D converter 240 which converts this signal to a binary coded decimal output coupled to the decoder/driver 250. A potentiometer 268 coupled to the converter 240 assures the output from the display 210 spans 90° as the wheel turns 90°. A second input 270 is coupled to an output from the rear wheel potentiometers 140a, 130b and is converted to a digital output on the console display 220 by a second analog-to-digital converter 242 and display driver 252.

The line drivers 230, 232 are activated by outputs from the two analog-to-digital converters 240, 242 to controllably light up both digits of the displays 210, 220 in sequence to make it appear that both are simultaneously energized. Based upon the magnitude of the voltage at the inputs 260, 270 the converters 240, 242 also cause turn indicator LED's 280R, 280L to light up to aprise the operator (or diagnostician) in which direction the wheels are turning. When the LED 280L is lit up the associated wheels (front or rear) are turned to the left and when the LED 280R is lit up the associated wheels are turned to the right. The two potentiometers 266, 268 allow the circuit 200 to be adjusted so the displays 210, 220 and turn LED's 280R, 280L accurately depict the wheel orientation.

The present steering control system has been described in conjunction with a vehicle 10 where the two front wheels 60 and two rear wheels 62 are mechanically tied together. The control system of the invention is not limited to such a construction, however, and it should be appreciated that other modifications and alterations from the disclosed preferred embodiment would be apparent to one skilled in the art. The invention is not limited to hydraulically driven wheels, and has applicability to mechanically and electrically driven wheels. Also, the invention is not limited to utility vehicles and can be used with over-the-road cars and trucks. With the increased use of microprocessor controllers in motor vehicles, it is further anticipated that the comparator functions, generation of a difference signal, etc., may be accomplished with either a dedicated microprocessor or general purpose controller that performs other motor vehicle monitoring tasks. It is therefore the intent that the invention include all such modifications and alterations falling within the spirit or scope of the appended claims.

I claim:

1. A multi-mode steering control system for use in a vehicle having independent front and rear wheel steering comprising:
    (a) drive means for controllably turning a controlled vehicle wheel, said drive means including a servo drive circuit and a servo valve, which when activated by the servo drive circuit in one sense turns said controlled wheel in one direction and when activated by the servo drive circuit in an opposite sense turns the controlled wheel in an opposite direction;
    (b) first and second wheel orientation sensing means for producing first and second orientation signals corresponding to an orientation of at least one rear wheel and at least one front wheel; and,
    (c) comparator means having inputs responsive to the first and second orientation signals for generating a control signal related to a difference between said first and second orientation signals, said comparator means having a control output coupled to the servo drive circuit to energize the drive circuit and control an alignment of said controlled wheel;
    (d) said servo drive circuit including an oscillating signal generator for producing an oscillating signal and means for combining the control output from the comparator means with said oscillating signal to produce an oscillating control signal for activating said servo valve.

2. The vehicle steering control system of claim 1 additionally comprising (a) mode switch means for selectively by-passing orientation signals from one of said first and second wheel orientation sensing means and (b) means for generating a fixed signal related to a desired fixed orientation of at least one vehicle wheel.

3. A vehicle comprising: a vehicle body; two front wheels rotatably mounted to the body for synchronous turning movement; two rear wheels rotatably mounted to the body for synchronous turning movement; four hydraulically driven steering motors, each coupled to an associated one of said front and rear wheels for effecting a turning of said wheels; a source of pressurized fluid for powering said motors; first conduit means for supplying said pressurized fluid to the front wheels and second conduit means for supplying said pressurized fluid to the rear wheels; and a power steering system, said power steering system comprising:
  (a) a steering control valve interposed between the pressurized source and the first and second conduit means, said steering control valve coupled to a vehicle steering mechanism to turn the vehicle to the right and to the left by directing fluid pressure to said steering motors;
  (b) on/off valve means coupled to said first and second conduit means to direct pressurized fluid from the steering control valve to steering motors for steering a master set of front or rear wheels;
  (c) servo control means coupled to the pressurized source to direct pressurized fluid to steering motors for turning a slave set of wheels not coupled to the steering control valve by the on/off valve means;
  (d) feedback control means including means for monitoring the orientation of at least one wheel of the master set of wheels and at least one wheel of the slave set of wheels and activating the servo control means to cause the slave wheels to be re-oriented based upon said monitoring; and
  (e) mode select means controllable by a vehicle user and coupled to the on/off valve means, servo control means, and feedback control means to select a master and slave set of wheels and a mode of response of the slave wheels to the monitoring of the wheel orientation.

4. The vehicle of claim 3 including a visual display for separately providing a visual indication of orientation of the two rear wheels and the two front wheels.

5. The vehicle of claim 4 where the visual display indicates wheel orientation in degrees of offset from a reference orientation.

6. A steering method for a vehicle having independent front and rear wheel steering comprising the steps of:
  (a) designating a master set of wheels and causing said master set of wheels to turn to the right and to the left in response to operator control of a steering mechanism;
  (b) monitoring a slave set of wheels orientation and generating a slave signal related to the orientation of the slave set of wheels;
  (c) generating a master signal related to a desired orientation of the slave wheels;
  (d) comparing the slave signal with the master signal and producing a difference signal related to any discrepancy between the master and slave signal; and
  (e) combining an oscillating signal with the difference signal and causing the slave wheels to turn an amount related to the combined oscillating and difference signal to reduce discrepancies between the master and the slave signals.

7. The method of claim 6 where the master signal is generated by monitoring the orientation of the master set of wheels.

8. The method of claim 6 where the master signal is a constant signal corresponding to a straight orientation for the slave set of wheels.

9. A multi-mode steering control system for steering a motor vehicle having independent front and rear wheel steering comprising:
  (a) drive means for controllably turning a controlled vehicle wheel, said drive means including a drive circuit and a motor, which when activated by the drive circuit in one sense turns said controlled wheel in one direction and when activated by the drive circuit in an opposite sense turns the controlled wheel in an opposite direction;
  (b) first and second wheel orientation sensing means for producing first and second orientation signals corresponding to an orientation of at least one rear wheel and at least one front wheel; and,
  (c) comparator means having inputs responsive to the first and second orientation signals for generating a control signal related to a difference between said first and second orientation signals, said comparator means having a control output coupled to the drive circuit to energize the drive circuit and control an alignment of said controlled wheel;
  (d) said drive circuit including an oscillating signal generator for producing an oscillating signal and means for combining the control output from the comparator with the oscillating signal.

10. The vehicle steering control system of claim 9 additionally comprising (a) mode switch means for selectively by-passing orientation signals from one of said first and second wheel orientation sensing means and (b) means for generating a fixed signal related to a desired fixed orientation of at least one vehicle wheel.

* * * * *